United States Patent
Asano (10) Patent No.: US 9,394,966 B2
(45) Date of Patent: Jul. 19, 2016

(54) VIBRATION SUPPRESSION APPARATUS AND VIBRATION SUPPRESSION METHOD

(71) Applicant: CANON KABUSHIKI KAISHA, Tokyo (JP)

(72) Inventor: Tosiya Asano, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 114 days.

(21) Appl. No.: 13/777,016

(22) Filed: Feb. 26, 2013

(65) Prior Publication Data

US 2013/0240705 A1    Sep. 19, 2013

(30) Foreign Application Priority Data

Mar. 14, 2012    (JP) .................................. 2012-057875

(51) Int. Cl.
F16F 15/04    (2006.01)
F16F 15/00    (2006.01)
F16F 15/027    (2006.01)

(52) U.S. Cl.
CPC ............... *F16F 15/04* (2013.01); *F16F 15/002* (2013.01); *F16F 15/027* (2013.01)

(58) Field of Classification Search
USPC ........... 188/378, 380; 267/136; 248/550, 562, 248/566
See application file for complete search history.

(56) References Cited

U.S. PATENT DOCUMENTS

| | | | |
|---|---|---|---|
| 6,193,206 B1* | 2/2001 | Yasuda et al. ................. | 248/550 |
| 6,378,672 B1* | 4/2002 | Wakui ........................... | 188/378 |
| 7,571,793 B2* | 8/2009 | Warmerdam et al. ......... | 188/378 |
| 8,091,694 B2* | 1/2012 | Vervoordeldonk et al. ... | 188/378 |
| 2007/0035074 A1* | 2/2007 | Vervoordeldonk ..... | F16F 15/02 267/140.11 |
| 2011/0127400 A1* | 6/2011 | Kastelijn et al. .............. | 248/550 |

FOREIGN PATENT DOCUMENTS

| | | |
|---|---|---|
| JP | 2007-522393 A | 8/2007 |
| WO | 2005-073592 A | 8/2005 |

* cited by examiner

*Primary Examiner* — Christopher Schwartz
(74) *Attorney, Agent, or Firm* — Rossi, Kimms & McDowell LLP

(57) ABSTRACT

The present invention provides a vibration suppression apparatus which includes a first object elastically supported on a base, a second object elastically supported on the first object, and a driving unit configured to drive the first object, and which suppresses a vibration of the second object, comprising a first generation unit configured to generate a first signal, a second generation unit configured to generate a second signal, and a control unit configured to control the driving unit, wherein the control unit controls the driving unit based on the first signal, and after the deviation between the relative distance between the base and the first object, and the first reference distance falls within an allowable range, the control unit controls the driving unit based on the first signal and the second signal.

6 Claims, 7 Drawing Sheets

VIBRATION SUPPRESSION APPARATUS AND VIBRATION SUPPRESSION METHOD

BACKGROUND OF THE INVENTION

1. Field of the Invention

The present invention relates to a vibration suppression apparatus and vibration suppression method.

2. Description of the Related Art

Recently, as the circuit patterns of semiconductor integrated circuits are becoming finer and increasing the degree of integration, higher accuracy is requested of lithography apparatuses such as an exposure apparatus using the lithography technique. To increase the accuracy of the lithography apparatus, vibrations propagating from the outside such as a base to the lithography apparatus need to be suppressed because they decrease the overlay accuracy and resolution (transfer) performance.

Since a vibration suppression apparatus used for the lithography apparatus generally uses an air spring and has a natural frequency of about 2 to 3 Hz, it cannot suppress vibrations of low frequencies (1 Hz or less) such as vibrations (walking-induced vibrations) caused by movement of a person and vibrations of a building. The vibration suppression apparatus therefore needs to suppress not only high-frequency vibrations but also low-frequency ones. To suppress low-frequency vibrations, Japanese Patent Laid-Open No. 2007-522393 proposes a vibration suppression apparatus including two objects supported in series on a base by elastic supports, a sensor which measures the relative distance between the two objects, and an actuator which drives the base-side object.

The vibration suppression apparatus described in Japanese Patent Laid-Open No. 2007-522393 sets, as a reference distance, a relative distance between the two objects that has been measured by the sensor for the first time, and controls the actuator to reduce the deviation between a relative distance between the two objects, and the reference distance. However, when the sensor measures the relative distance between the two objects for the first time to set a reference distance, an offset may be generated between the steady value of the elastic support (the length of the elastic support when the elastic support does not vibrate) between the two objects, and the set reference distance. While the offset is generated, the actuator drives the base-side object to reduce the offset. Thus, although the relative distance between the two objects is maintained at the reference distance, the distance between the base-side object and the base changes at a uniform acceleration. As a result, the distance between the base-side object and the base may exceed the movable range of the elastic support interposed between the base-side object and the base, the elastic support may be broken, and the vibration suppression apparatus may not be able to suppress vibrations anymore.

SUMMARY OF THE INVENTION

The present invention provides a technique advantageous for suppressing vibrations propagating from the outside such as a base.

According to one aspect of the present invention, there is provided a vibration suppression apparatus which includes a first object elastically supported on a base, a second object elastically supported on the first object, and a driving unit configured to be interposed between the base and the first object and drive the first object, and which suppresses a vibration of the second object, comprising: a first generation unit configured to generate a first signal which instructs a driving amount of the driving unit to reduce a deviation between a relative distance between the base and the first object, and a first reference distance; a second generation unit configured to generate a second signal which instructs a driving amount of the driving unit to reduce a deviation between a relative distance between the first object and the second object, and a second reference distance; and a control unit configured to control the first generation unit, the second generation unit, and the driving unit, wherein the control unit operates the first generation unit and controls the driving unit based on the first signal, and after the deviation between the relative distance between the base and the first object, and the first reference distance falls within an allowable range, the control unit operates the second generation unit and controls the driving unit based on the first signal and the second signal.

According to one aspect of the present invention, there is provided a vibration suppression method in a vibration suppression apparatus which includes a first object elastically supported on a base, a second object elastically supported on the first object, a driving unit configured to be interposed between the base and the first object and drive the first object, a first generation unit configured to generate a first signal that instructs a driving amount of the driving unit to reduce a deviation between a relative distance between the base and the first object, and a first reference distance, and a second generation unit configured to generate a second signal that instructs a driving amount of the driving unit to reduce a deviation between a relative distance between the first object and the second object, and a second reference distance, and which suppresses a vibration of the second object, comprising: operating the first generation unit to control the driving unit based on the first signal; and after the deviation between the relative distance between the base and the first object, and the first reference distance falls within an allowable range, operating the second generation unit to control the driving unit based on the first signal and the second signal.

Further aspects of the present invention will become apparent from the following description of exemplary embodiments with reference to the attached drawings.

DESCRIPTION OF THE EMBODIMENTS

Exemplary embodiments of the present invention will be described below with reference to the accompanying draw-

First Embodiment

Figure 1:
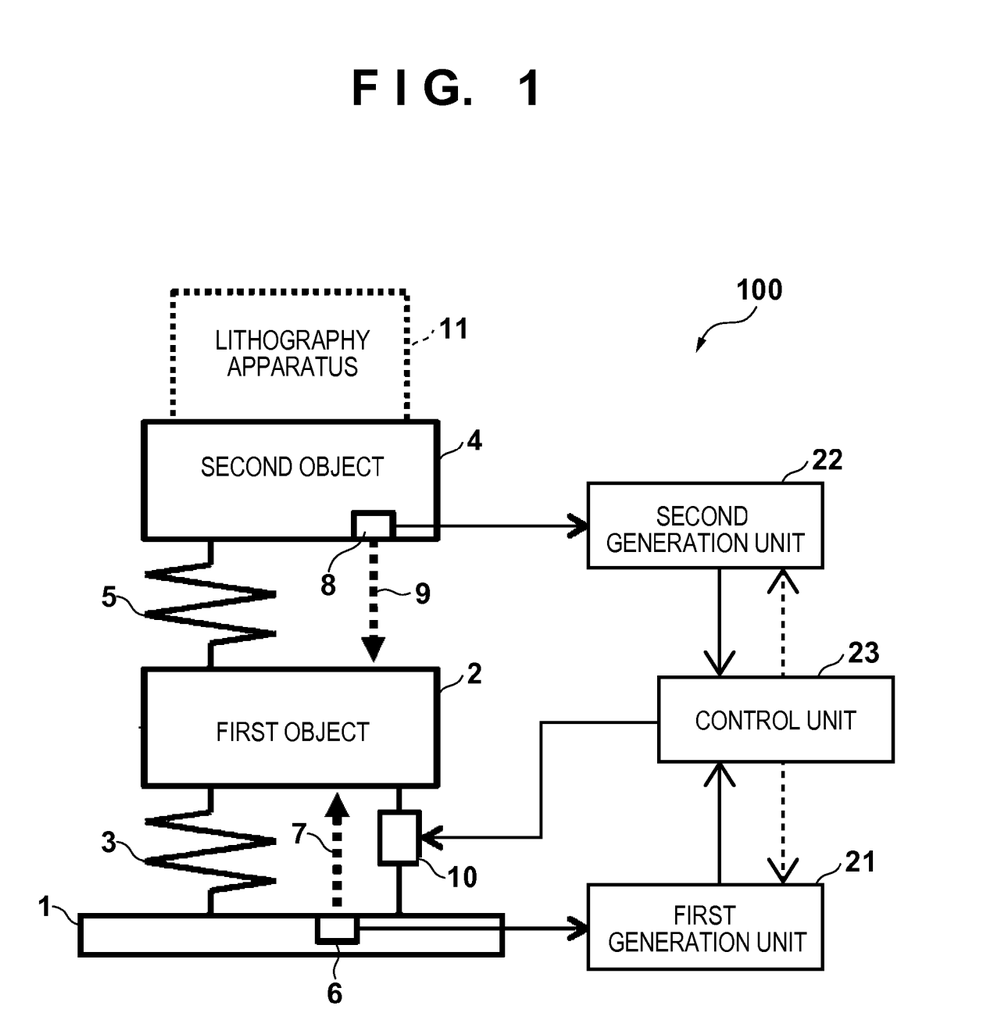
FIG. 1 is a view showing a vibration suppression apparatus according to the first embodiment of the present invention.

A vibration suppression apparatus 100 according to the first embodiment of the present invention will be described with reference to FIG. 1. The vibration suppression apparatus generally suppresses vibrations in the vertical direction (Z direction) and the horizontal direction (X and Y directions). Vibration suppression in the vertical direction (Z direction) will be explained for the vibration suppression apparatus 100 according to the first embodiment. The vibration suppression apparatus 100 according to the first embodiment includes a base 1, first object 2, second object 4, and driving unit 10. The vibration suppression apparatus 100 also includes a first measurement unit 6, second measurement unit 8, first generation unit 21, second generation unit 22, and control unit 23.

The base 1 is fixed to a foundation (floor) in a place where a lithography apparatus 11 such as a drawing apparatus or exposure apparatus is installed. The first object 2 is elastically supported on the base 1 by a first spring member 3, and the second object 4 is elastically supported on the first object 2 by a second spring member 5. Note that the lithography apparatus 11 is placed on the second object 4.

The driving unit 10 is interposed between the base 1 and the first object 2, and can drive the first object 2 in the vertical direction (Z direction) by applying a force to the first object 2. The driving unit 10 includes, for example, an actuator formed from a linear motor and a current driver for supplying a current to the coil of the linear motor. The control unit 23 (to be described later) supplies a signal to the current driver, the current driver supplies a current corresponding to the signal to the coil, and then the linear motor drives the first object 2.

The first measurement unit 6 measures a relative distance 7 (to be referred to as a first relative distance 7 hereinafter) between the base 1 and the first object 2. The first measurement unit 6 includes a laser interferometer or the like, is arranged in the base 1, as shown in FIG. 1, and measures the distance to the first object 2 to obtain the first relative distance 7. The second measurement unit 8 measures a relative distance 9 (to be referred to as a second relative distance 9 hereinafter) between the first object 2 and the second object 4. Similar to the first measurement unit 6, the second measurement unit 8 includes a laser interferometer or the like, is arranged in the second object 4, as shown in FIG. 1, and measures the distance to the first object 2 to obtain the second relative distance 9.

Figure 2:
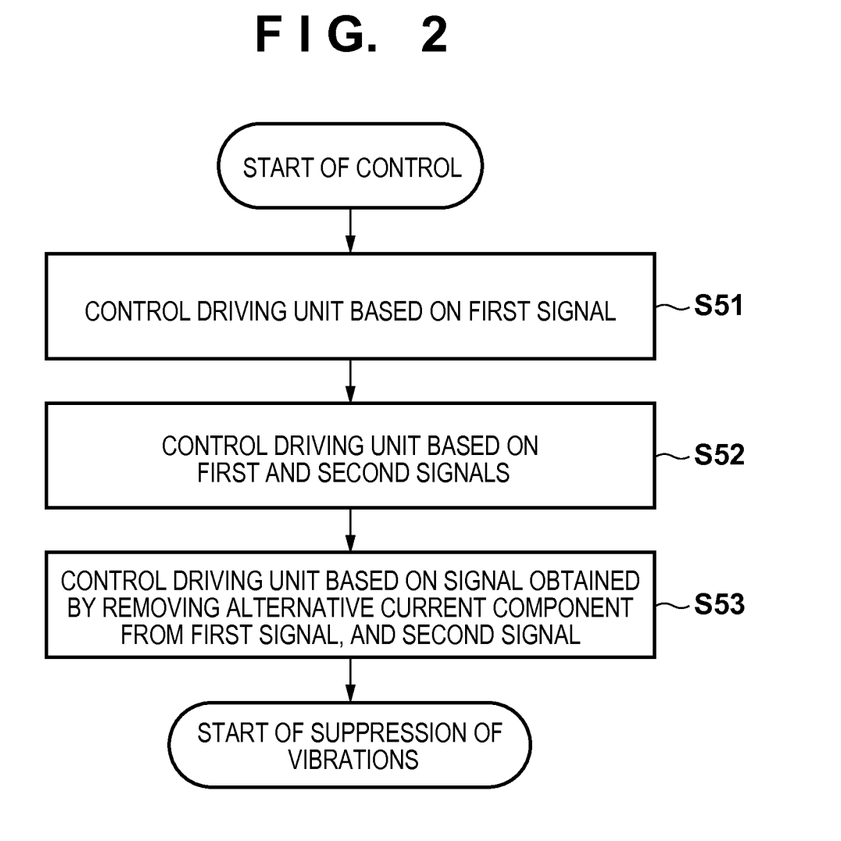
FIG. 2 is a flowchart showing an operation until the vibration suppression apparatus according to the first embodiment starts suppression of vibrations.

The first generation unit 21 calculates the deviation between the first relative distance 7 and the first reference distance, and generates the first signal which instructs the driving amount of the driving unit 10 to reduce the calculated deviation. The first relative distance 7 measured by the first measurement unit 6 when the first generation unit 21 operates and starts generation of the first signal is set as the first reference distance. The first generation unit 21 includes a filter which removes an alternative current component from the generated first signal, and whether the filter functions or not can be switched. As will be described later, the control unit 23 controls the filter not to function in steps S51 and S52 because no alternative current component is removed, and to function in step S53 in order to remove an alternative current component. Note that the filter in the vibration suppression apparatus 100 according to the first embodiment is arranged in the first generation unit 21, but may be interposed between the first generation unit 21 and the control unit 23 or in the control unit 23 because it suffices to remove an alternative current component from the first signal before combining the first and second signals.

The second generation unit 22 calculates the deviation between the second relative distance 9 and the second reference distance, and generates the second signal which instructs the driving amount of the driving unit 10 to reduce the calculated deviation. The second relative distance 9 measured by the second measurement unit 8 when the second generation unit 22 operates and starts generation of the second signal is set as the second reference distance. At this time, if the length of the second spring member 5 (to be referred to as the steady value of the second spring member 5 hereinafter) in a state (steady state) in which the second spring member 5 does not vibrate is set as the second reference distance, a problem to be described later in a conventional vibration suppression apparatus does not occur. However, the second reference distance (the second relative distance 9 measured by the second measurement unit 8) rarely takes the steady value of the second spring member 5.

The control unit 23 controls the first generation unit 21, second generation unit 22, and driving unit 10. As will be described later, the control unit 23 operates the first generation unit 21, and controls the driving unit 10 based on the first signal supplied from the first generation unit 21. After the deviation between the first relative distance 7 and the first reference distance falls within an allowable range, the control unit 23 operates the second generation unit 22, combines the second signal supplied from the second generation unit 22 and the first signal, and controls the driving unit 10 based on the combined signal. Note that the allowable range is the range of a maximum allowable deviation using the first reference distance as a reference.

Figure 7:
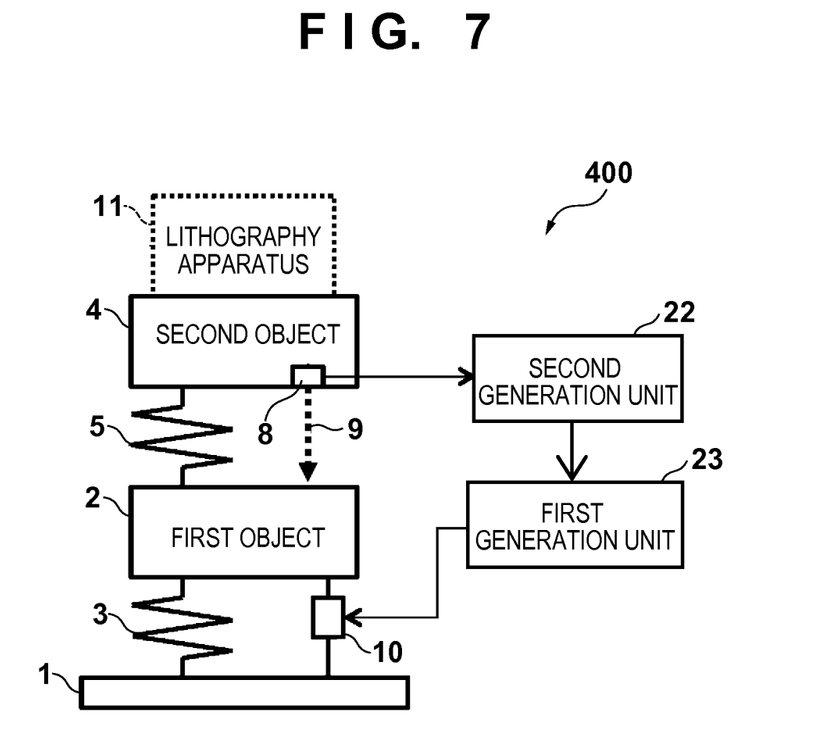
FIG. 7 is a view showing a conventional vibration suppression apparatus.

A conventional vibration suppression apparatus will be explained. As shown in FIG. 7, a conventional vibration suppression apparatus 400 includes neither the first measurement unit 6 nor the first generation unit 21, and a control unit 23 controls a driving unit 10 based on only the second signal.

Similar to the vibration suppression apparatus 100 according to the first embodiment, the conventional vibration suppression apparatus 400 includes a base 1, a first object 2 elastically supported on the base 1 by a first spring member 3, and a second object 4 elastically supported on the first object 2 by a second spring member 5. The conventional vibration suppression apparatus 400 also includes the driving unit 10, a second measurement unit 8, a second generation unit 22, and the control unit 23. Note that the driving unit 10, second measurement unit 8, and second generation unit 22 are the same as those in the vibration suppression apparatus 100 according to the first embodiment, and a description thereof will not be repeated. The control unit 23 controls the driving unit 10 based on only the second signal generated by the second generation unit 22.

In the conventional vibration suppression apparatus 400, when the vibration suppression apparatus 400 starts suppression of vibrations of the second object 4, that is, when the second generation unit 22 starts generation of the second signal, the second measurement unit 8 measures a second relative distance 9, and the measured second relative distance 9 is set as the second reference distance. At this time, the second reference distance rarely becomes the length of the second spring member 5 (to be referred to as the steady value of the second spring member 5 hereinafter) in a state (steady state) in which the second spring member 5 does not vibrate. This is because an offset is generated between the second reference distance and the steady value of the second spring member 5 owing to vibrations from the base 1 and the like.

While the offset is generated, the second spring member 5 tries to take its steady value, but the second generation unit 22 generates the second signal to reduce the deviation between the second relative distance 9 and the second reference distance which is not the steady value of the second spring member 5. Since the control unit 23 controls the driving unit 10 based on the second signal, the second relative distance 9 is maintained at the second reference distance which is not the steady value of the second spring member 5. However, the relative distance (a first relative distance 7) between the base 1 and the first object 2 changes at a uniform acceleration. As a result, the relative distance between the base 1 and the first object 2 sometimes exceeds the movable range of the first spring member 3. Accordingly, the first spring member 3 is broken, and the vibration suppression apparatus 400 cannot suppress vibrations from the base 1 anymore.

To prevent the uniformly accelerated change of the first relative distance 7 arising from the offset between the second reference distance and the steady value of the second spring member 5, the vibration suppression apparatus 100 according to the first embodiment includes the first measurement unit 6 and first generation unit 21. An operation until the vibration suppression apparatus 100 according to the first embodiment starts suppression of vibrations will be explained with reference to a flowchart shown in FIG. 2.

In step S51, the control unit 23 operates the first generation unit 21, and controls the driving unit 10 based on the first signal generated by the first generation unit 21. The driving unit 10 then drives the first object 2 to reduce the deviation between the first relative distance 7 and the first reference distance, and the first object 2 can be stopped at a predetermined position with respect to the base 1.

In step S52, after the deviation between the first relative distance 7 and the first reference distance falls within the allowable range, the control unit 23 operates the second generation unit 22, combines the second signal supplied from the second generation unit 22 and the first signal, and controls the driving unit 10 based on the combined signal. When setting the second reference distance in step S52, an offset may be generated between the second reference distance and the steady value of the second spring member 5 owing to vibrations from the base 1. While the offset is generated, the second generation unit 22 generates the second signal which instructs the driving amount of the driving unit 10 to reduce the deviation between the second relative distance 9 and the second reference distance which is not the steady value of the second spring member 5, similar to the conventional vibration suppression apparatus 400. If the control unit 23 controls the driving unit 10 based on only the second signal, the second relative distance 9 is maintained at the second reference distance which is not the steady value of the second spring member 5, but the first relative distance 7 changes at a uniform acceleration. In the first embodiment, therefore, the control unit 23 operates the second generation unit 22 without stopping the operation of the first generation unit 21, combines the first and second signals, and controls the driving unit 10 based on the combined signal. At this time, the first signal supplied from the first generation unit 21 is a signal which instructs the driving amount of the driving unit 10 to reduce the deviation between the first relative distance 7 and the first reference distance, and thus is a signal which cancels the second signal that changes the first relative distance 7 at a uniform acceleration. As a consequence, the first relative distance 7 does not change at a uniform acceleration, and the first object 2 and second object 4 converge to predetermined positions.

In step S53, after the second generation unit 22 operates and the deviation between the second relative distance 9 and the second reference distance falls within the allowable range, the control unit 23 controls the first generation unit 21 so that the filter in the first generation unit functions and removes an alternative current component from the first signal. Also, in step S53, the second generation unit 22 supplies the second signal to the control unit 23. The control unit 23 then controls the driving unit 10 based on a signal obtained by removing an alternative current component from the first signal, and the second signal. The signal obtained by removing an alternative current component from the first signal cancels only a signal component of the second signal that changes the first relative distance 7 at a uniform acceleration. Hence, only a signal component which reduces the deviation between the second relative distance 9 and the second reference distance, that is, a signal component which suppresses vibrations propagating from the base 1 to the second object 4 remains in the combined signal of the signal obtained by removing an alternative current component from the first signal, and the second signal. Accordingly, the control unit 23 can control the driving unit 10 to prevent a uniformly accelerated change of the first relative distance 7 and suppress vibrations propagating from the base 1 to the second object 4.

Figure 3:
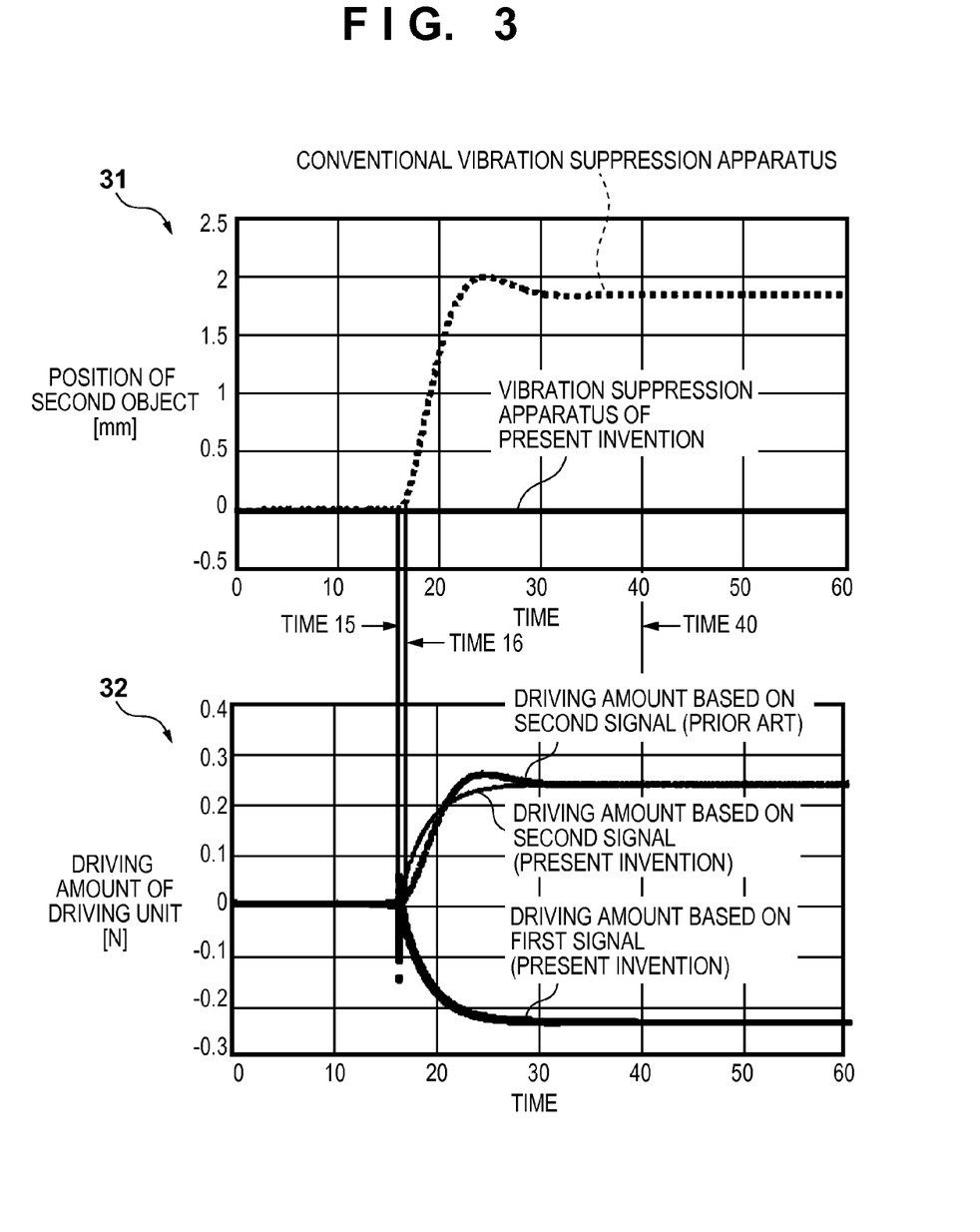
FIG. 3 is a graph showing the result of comparison between the vibration suppression apparatus according to the first embodiment and a conventional vibration suppression apparatus in terms of the position of the second object and the driving amount of a driving unit.

FIG. 3 shows the result of comparison between the vibration suppression apparatus 100 according to the first embodiment and the conventional vibration suppression apparatus 400 in terms of the position of the second object 4 and the driving amount of the driving unit 10. FIG. 3 shows time 15, time 16, and time 40. Time 15 is the time (corresponding to step S51) when the control unit 23 of the vibration suppression apparatus 100 according to the first embodiment starts controlling the driving unit 10 based on the first signal. Time 16 is the time (corresponding to step S52) when the control unit 23 of the vibration suppression apparatus 100 according to the first embodiment starts controlling the driving unit 10 based on the first and second signals. Time 40 is the time (corresponding to step S53) when the control unit 23 of the vibration suppression apparatus 100 according to the first embodiment starts controlling the driving unit 10 based on a signal obtained by removing an alternative current component from the first embodiment, and the second signal. Also, time 16 is the time when the control unit 23 of the conventional vibration suppression apparatus 400 starts controlling the driving unit 10 based on the second signal.

A graph 31 in FIG. 3 shows the position of the second object 4 with respect to the time. In the graph 31, the ordinate represents the deviation between the position of the second object 4 and a reference position. On the ordinate, 0 mm corresponds to the reference position. The reference position is the position of the second object 4 with respect to the base 1 in a state (steady state) in which the base 1 does not vibrate, and the first spring member 3 and second spring member 5 have their steady values. In the conventional vibration suppression apparatus 400, the position of the second object 4 gradually rises from time 16 when the control unit 23 starts controlling the driving unit 10 based on the second signal, and the second object 4 stays at almost a constant position of about +2 mm from the reference position around time 40. In the conventional vibration suppression apparatus 400, the second generation unit 22 includes a high-pass filter in order to suppress the rise of the position of the second object 4, that is, prevent an increase in the relative distance between the base 1 and the first object 2. Since the high-pass filter makes almost constant the driving amount of the driving unit 10 instructed by the second signal (a driving amount by the second signal), the relative distance between the base 1 and the first object also becomes almost constant, and the rise of the position of the second object can be suppressed. However, even if the position of the second object is made almost constant by using the high-pass filter, an offset of about +2 mm still remains as in the graph 31. Owing to the generated offset, when the relative distance between the base 1 and the first object 2 exceeds the movable range of the first spring member 3, the first spring member 3 may be broken, and the conventional vibration suppression apparatus 400 cannot suppress vibrations anymore. To the contrary, in the vibration suppression apparatus 100 according to the first embodiment, the position of the second object 4 does not vary and stays constant at the reference position (0 mm).

A graph 32 in FIG. 3 shows the driving amount of the driving unit 10 with respect to the time. In the graph 32, the ordinate represents the driving amount of the driving unit 10 instructed by the first signal generated by the first generation unit 21 or the second signal generated by the second generation unit 22 (to be referred to as a driving amount based on the first signal and a driving amount based on the second signal hereinafter). In the conventional vibration suppression apparatus 400, the driving amount based on the second signal increases from time 16 when the control unit 23 starts controlling the driving unit 10 based on the second signal, and becomes almost constant around 0.25 N. The driving amount based on the second signal becomes almost constant because the second generation unit 22 includes the high-pass filter for preventing the second signal from containing an alternative current component, as described above. Although the high-pass filter has a time constant and thus takes time until the driving amount based on the second signal becomes almost constant, it prevents the second signal from containing an alternative current component. For this reason, the driving amount based on the second signal becomes almost constant while suppressing a uniformly accelerated increase. Since an increase in the driving amount based on the second signal means that the driving unit 10 drives the first object 2 upward and raises the second object 4, the position of the second object 4 also exhibits the same trend, as represented by the graph 31. In the vibration suppression apparatus 100 according to the first embodiment, the driving amount based on the second signal exhibits almost the same trend as that of the driving amount based on the second signal in the conventional vibration suppression apparatus 400. However, the driving amount based on the first signal has a value of a sign opposite to that of the driving amount based on the second signal. Hence, combining the driving amount based on the first signal and that based on the second signal can substantially cancel a driving amount by which the driving unit 10 drives the first object 2 upward, so the position of the second object 4 does not rise. From time 40, the control unit 23 controls the driving unit 10 based on a signal obtained by removing an alternative current component from the first signal, and the second signal, as described in step S53, in order to restrict upward driving of the first object 2 by the driving unit 10 and not to raise the second object 4, similar to the operation immediately before time 40. From time 40, the second signal contains a signal component which suppresses vibrations from the base 1. This signal component is not canceled by the signal obtained by removing an alternative current component from the first signal. From time 40, therefore, the control unit 23 can control the driving unit 10 to suppress vibrations propagating from the base 1 to the second object 4.

As described above, the vibration suppression apparatus 100 according to the first embodiment includes the first measurement unit 6 and first generation unit 21. The first generation unit 21 generates the first signal which instructs the driving amount of the driving unit 10 to reduce the deviation between the first relative distance 7 and the first reference distance. After the deviation between the first relative distance 7 and the first reference distance falls within the allowable range, the control unit 23 of the vibration suppression apparatus 100 controls the driving unit 10 based on the first and second signals. This can prevent a uniformly accelerated change of the first relative distance 7 arising from an offset between the second reference distance and the steady value of the second spring member 5. The control unit 23 can control the driving unit 10 to suppress vibrations propagating from the base 1 to the second object 4.

Second Embodiment

Figure 4:
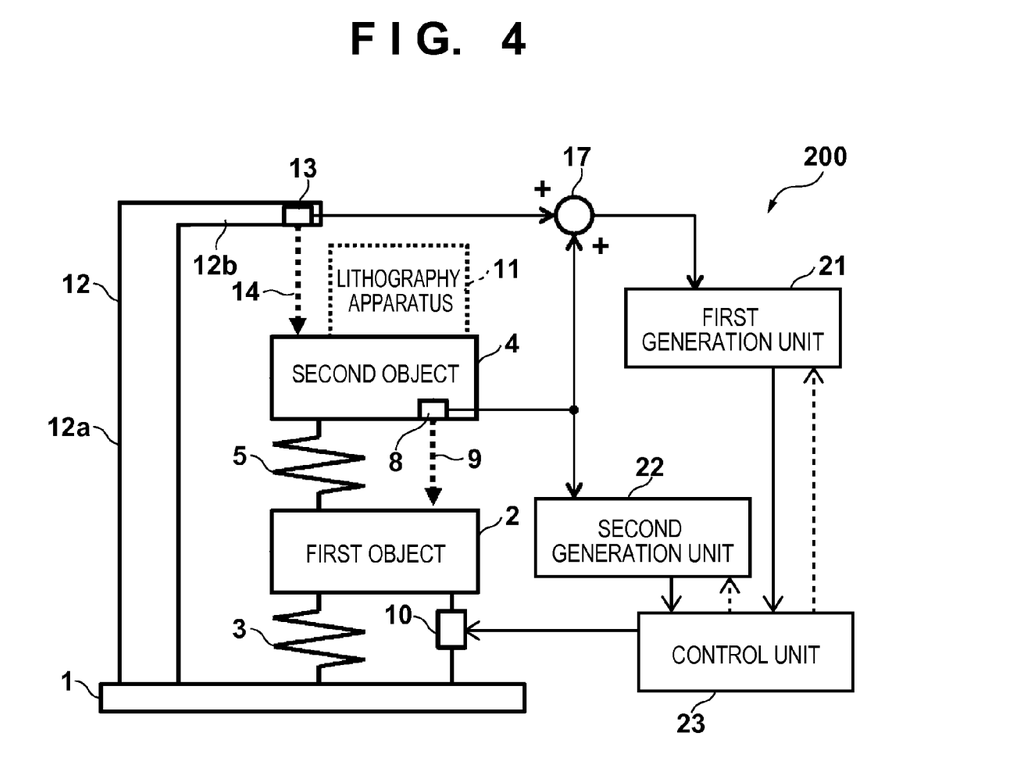
FIG. 4 is a view showing a vibration suppression apparatus according to the second embodiment of the present invention.

A vibration suppression apparatus 200 according to the second embodiment of the present invention will be described with reference to FIG. 4. Unlike the vibration suppression apparatus 100 according to the first embodiment, the vibration suppression apparatus 200 according to the second embodiment does not include the first measurement unit 6, but further includes a pedestal 12, third measurement unit 13, and adder 17. The pedestal 12 is fixed to a base 1, and has an inverted L shape formed from a post 12a and top plate 12b. The third measurement unit 13 is arranged in the top plate 12b, and measures a relative distance 14 (to be referred to as a third relative distance 14 hereinafter) between the top plate 12b and a second object 4. The adder 17 calculates the relative distance between the base 1 and a first object 2 by subtracting the third relative distance 14 and a second relative distance 9 from the distance between the top plate 12b and the base 1 (the thicknesses of the first object 2 and second object 4 are also taken into consideration). In other words, the third measurement unit 13 measures the relative distance (a first relative distance 7) between the base 1 and the first object 2 by measuring the third relative distance 14 between the top plate 12b and the second object 4. Note that an operation until the vibration suppression apparatus 200 sets the second reference distance and starts suppression of vibrations, and the like are the same as those in the vibration suppression apparatus 100 according to the first embodiment, and a description thereof will not be repeated.

Similar to the vibration suppression apparatus 100 according to the first embodiment, the vibration suppression apparatus 200 according to the second embodiment can prevent a uniformly accelerated change of the first relative distance 7, and can suppress vibrations propagating from the base 1 to the second object 4. The vibration suppression apparatus 200 according to the second embodiment is effective when, for example, the gap between the base 1 and the first object 2 is small and it is difficult to measure the first relative distance 7.

Third Embodiment

Figure 5:
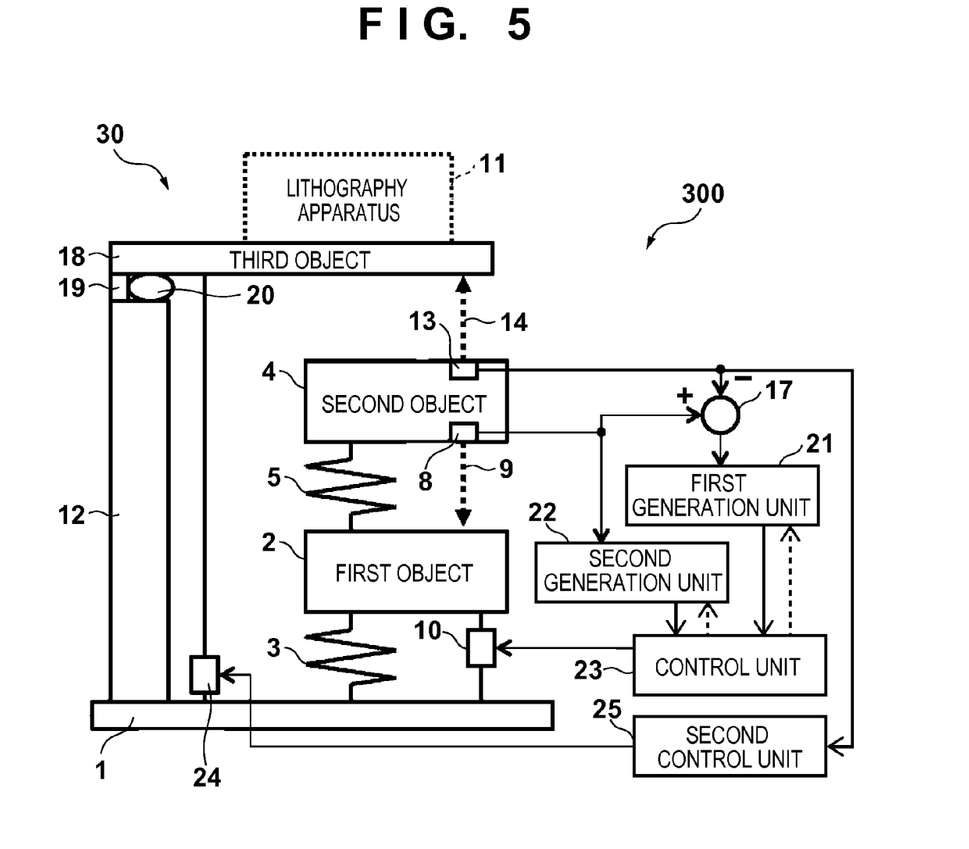
FIG. 5 is a view showing a vibration suppression apparatus according to the third embodiment of the present invention.

A vibration suppression apparatus 300 according to the third embodiment of the present invention will be described with reference to FIG. 5. Unlike the vibration suppression apparatus 100 according to the first embodiment, the vibration suppression apparatus 300 according to the third embodiment further includes a vibration suppression system 30, and uses a vibration suppression apparatus 100 as the measurement reference of the vibration suppression system 30. The vibration suppression system 30 is formed from a third object 18, pedestal 12, fixing table 19, air spring 20, second driving unit 24, and second control unit 25. The vibration suppression apparatus 300 according to the third embodiment does not include the first measurement unit 6, but includes a third measurement unit 13.

The third object 18 is elastically supported by the air spring 20 on the pedestal 12 fixed to a base 1. The fixing table 19 is arranged beside the air spring 20, which are interposed between the third object 18 and the pedestal 12. When the air spring 20 is deflated, the fixing table 19 fixes the third object 18 to the pedestal 12. Note that a lithography apparatus 11 is placed on the third object 18.

The third measurement unit 13 measures a relative distance 14 (to be referred to as a third relative distance 14 hereinafter) between a second object 4 and the third object 18. The third measurement unit 13 includes a laser interferometer or the like, is arranged in the second object 4, as shown in FIG. 5, and measures the distance to the third object 18 to obtain the third relative distance 14.

The second driving unit 24 is interposed between the base 1 and the third object 18, and can drive the third object 18 in the vertical direction (Z direction) by applying a force to the third object 18. Similar to a driving unit 10, the second driving unit 24 includes, for example, an actuator formed from a linear motor and a current driver for supplying a current to the coil of the linear motor. The second control unit 25 supplies a signal to the current driver, the current driver supplies a current corresponding to the signal to the coil, and then the linear motor drives the third object 18. Also, the second control unit 25 controls the second driving unit 24 to reduce the deviation between the third relative distance 14 and the third reference distance. The third reference distance is the distance between the second object 4 and the third object 18 in a state in which the air spring 20 is filled with air.

Figure 6:
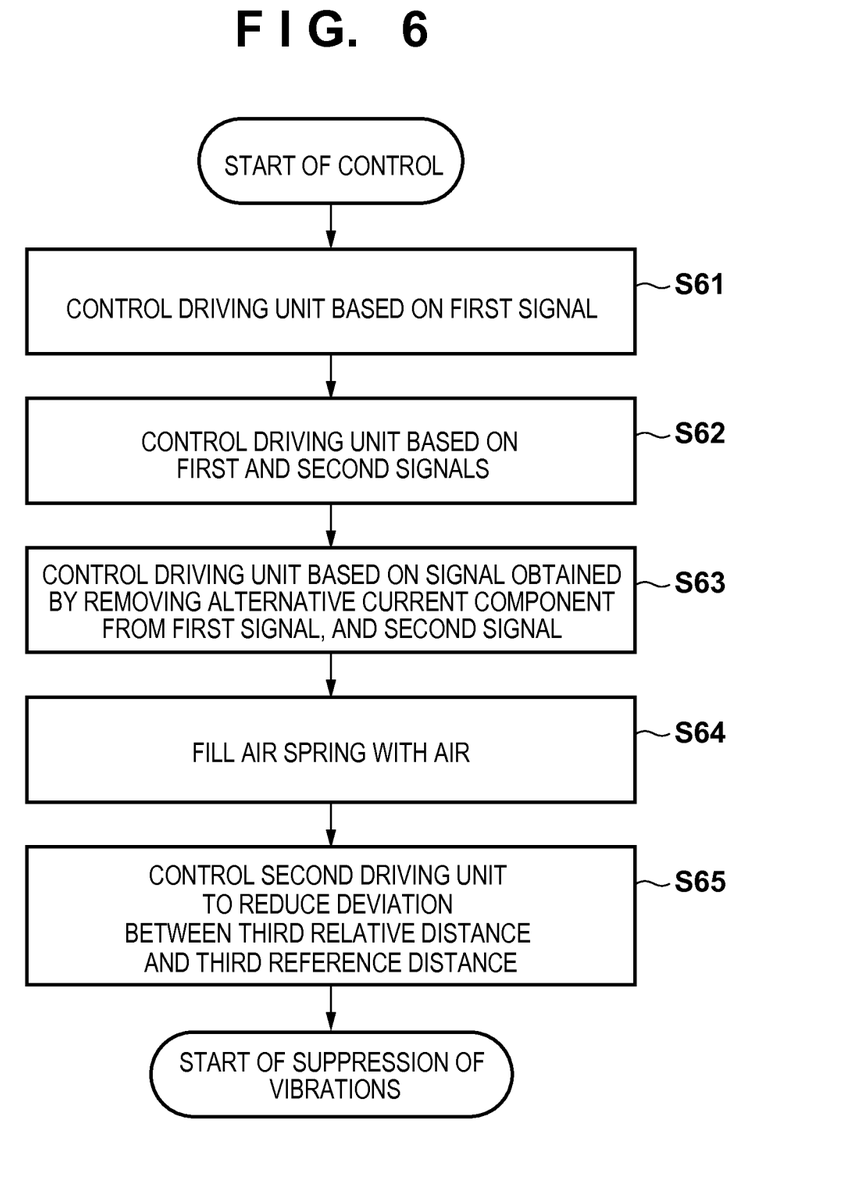
FIG. 6 is a flowchart showing an operation until the vibration suppression apparatus according to the third embodiment starts suppression of vibrations.

An operation until the vibration suppression apparatus 300 according to the third embodiment starts suppression of vibrations will be explained with reference to a flowchart shown in FIG. 6.

In step S61, a control unit 23 operates a first generation unit 21, and controls the driving unit 10 based on the first signal generated by the first generation unit 21. In step S61, the vibration suppression apparatus 300 is in a state in which the air spring 20 is deflated, that is, in a state in which the third object 18 is fixed to the pedestal 12 by the fixing table 19. In this state, a first relative distance 7 is calculated based on a second relative distance 9 measured by a second measurement unit 8 and the third relative distance 14 measured by the third measurement unit 13. More specifically, an adder 17 calculates the first relative distance 7 by subtracting the second relative distance 9 and the third relative distance 14 from the distance between the base 1 and the third object 18 in the state in which the third object 18 is fixed to the pedestal 12. The first relative distance 7 calculated by the adder 17 is supplied to the first generation unit 21, and the first generation unit 21 generates the first signal which instructs the driving amount of the driving unit 10 to reduce the deviation between the first relative distance 7 and the first reference distance. The control unit 23 controls the driving unit 10 based on the first signal, and a first object 2 can be stopped at a predetermined position with respect to the base 1.

In step S62, after the deviation between the first relative distance 7 and the first reference distance falls within the allowable range, the control unit 23 operates a second generation unit 22, combines the second signal supplied from the second generation unit 22 with the first signal, and controls the driving unit 10 based on the combined signal. This control is the same as that in step S52 described in the vibration suppression apparatus 100 according to the first embodiment.

In step S63, after the second generation unit 22 operates and the deviation between the second relative distance 9 and the second reference distance falls within the allowable range, the control unit 23 controls the first generation unit 21 to remove an alternative current component from the first signal. Also, in step S63, the second generation unit 22 supplies the second signal to the control unit 23. The control unit 23 then controls the driving unit 10 based on a signal obtained by removing an alternative current component from the first signal, and the second signal. This control is the same as that in step S53 described in the vibration suppression apparatus 100 according to the first embodiment. At this time, the control unit 23 can control the driving unit 10 to prevent a uniformly accelerated change of the first relative distance 7 and suppress vibrations propagating from the base 1 to the second object 4.

In step S64, the air spring 20 is filled with air to cancel the state in which the third object 18 is fixed to the pedestal 12. In step S65, the second control unit 25 controls the second driving unit 24 to reduce the deviation between the third relative distance 14 and the third reference distance. Since the vibration suppression apparatus 300 according to the third embodiment uses, as the measurement reference, the second object 4 for which vibrations from the base 1 are suppressed, the third object 18 can also suppress vibrations.

As described above, the vibration suppression apparatus 300 according to the third embodiment includes the vibration suppression system 30 including the third object, and the vibration suppression system 30 uses, as the measurement reference, the second object 4 for which vibrations are suppressed. Hence, the third object 18 can also suppress vibrations. Further, the vibration suppression apparatus 100 formed from the first object 2 and second object 4, as shown in FIG. 1, is only used as the measurement reference of the vibration suppression system 30 in the vibration suppression apparatus 300 according to the third embodiment. The arrangement (the vibration suppression apparatus 100) from the base 1 up to the second object 4 can be downsized, and along with this, the vibration suppression apparatus 300 according to the third embodiment can also be downsized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-057875 filed on Mar. 14, 2012, which is hereby incorporated by reference herein in its entirety.

What is claimed is:

1. A vibration suppression apparatus comprising:
   a base;
   a first object elastically supported on the base;
   a second object elastically supported on the first object;
   a driving unit interposed between the base and the first object and configured to drive the first object while suppressing a vibration of the second object;
   a first generation unit configured to generate a first signal that instructs a driving amount of the driving unit to reduce a deviation between a first reference distance and a relative distance between the base and the first object;
   a second generation unit configured to generate a second signal that instructs a driving amount of the driving unit to reduce a deviation between a second reference distance and a relative distance between the first object and the second object; and a control unit configured to control the first generation unit, the second generation unit, and the driving unit, and wherein the control unit controls:

the first generation unit to generate the first signal and control the driving unit based on the first signal; and after the deviation between the first reference distance and the relative distance between the base and the first object falls within an allowable range, the second generation unit to generate the second signal and control the driving unit based on both the first signal and the second signal.

2. The apparatus according to claim 1, wherein the control unit, while controlling the driving unit based on the first signal and the second signal, controls the driving unit based on a signal obtained by combining the first signal and the second signal.

3. The apparatus according to claim 1, wherein the control unit, after the deviation between the second reference distance and the relative distance between the first object and the second object falls within an allowable range, controls the first generation unit to remove an alternative current component from the first signal, and controls the driving unit based on the second signal and a signal obtained by removing the alternative current component from the first signal.

4. The apparatus according to claim 3, further comprising:
a third object elastically supported on the base;
a second driving unit interposed between the base and the third object, and configured to drive the third object; and
a second control unit configured to control the second driving unit,
wherein the second control unit, after the deviation between the second reference distance and the relative distance between the first object and the second object falls within the allowable range, controls the second driving unit to reduce a deviation between a third reference distance and a relative distance between the second object and the third object.

5. A vibration suppression method in a vibration suppression apparatus comprising:
a first object elastically supported on a base;
a second object elastically supported on the first object;
a driving unit interposed between the base and the first object and configured to drive the first object while suppressing a vibration of the second object;
a first generation unit configured to generate a first signal that instructs a driving amount of the driving unit to reduce a deviation between a first reference and a relative distance between the base and the first object; and
a second generation unit configured to generate a second signal that instructs a driving amount of the driving unit to reduce a deviation between a second reference distance and a relative distance between the first object and the second object,
wherein the method comprises the steps of:
controlling the first generation unit to generate the first signal and control the driving unit based on the first signal; and
controlling, after the deviation between the first reference distance and the relative distance between the base and the first object falls within an allowable range, the second generation unit to generate the second signal and control the driving unit based on both the first signal and the second signal.

6. A vibration suppression apparatus comprising:
a base;
a first object elastically supported on the base;
a second object elastically supported on the first object;
a driving unit interposed between the base and the first object and configured to drive the first object while suppressing a vibration of the second object;
a first measurement unit configured to measure a relative distance between the base and the first object;
a second measurement unit configured to measure a relative distance between the first object and the second object; and
a control unit configured to control the driving unit based on the relative distance between the base and the first object and the relative distance between the first object and the second object.

\* \* \* \* \*